United States Patent [19]

Kaniut

[11] 4,047,680

[45] Sept. 13, 1977

[54] SWINGTAIL FOR SPACECRAFT AND FOR FAST AIRCRAFT

[76] Inventor: Herbert M. Kaniut, Orrerweg 33/35, 5000 Cologne 71, Germany

[21] Appl. No.: 643,611

[22] Filed: Dec. 22, 1975

Related U.S. Application Data

[63] Continuation-in-part of Ser. No. 508,319, Dec. 4, 1974, abandoned.

[30] Foreign Application Priority Data

Aug. 16, 1974 Germany .......................... 2439479

[51] Int. Cl.² .............................................. B64C 5/10
[52] U.S. Cl. ........................................ 244/87; 244/218
[58] Field of Search ...................... 244/13, 43, 46–49, 244/87, 89

[56] References Cited

U.S. PATENT DOCUMENTS

| | | | |
|---|---|---|---|
| 2,376,636 | 5/1945 | Thompson | 244/43 |
| 2,670,910 | 3/1954 | Hill et al. | 244/46 |
| 3,447,761 | 6/1969 | Whitener et al. | 244/46 |
| 3,489,375 | 1/1970 | Tracy | 244/46 |
| 3,493,197 | 2/1970 | Spearman | 244/87 |
| 3,662,974 | 5/1972 | Peterson | 244/46 |

Primary Examiner—Trygve M. Blix
Assistant Examiner—Galen L. Barefoot

[57] ABSTRACT

Spacecraft having space shuttle capabilities and aircraft having supersonic and subsonic flight capabilities which utilize swinging horizontal tail halves to generally reduce the landing speeds and the required runway lengths, to enable landings of space shuttles or conventional airfields, and to improve the landing safety in favor of the crews, the passengers, and the airfield abutters.

11 Claims, 10 Drawing Figures

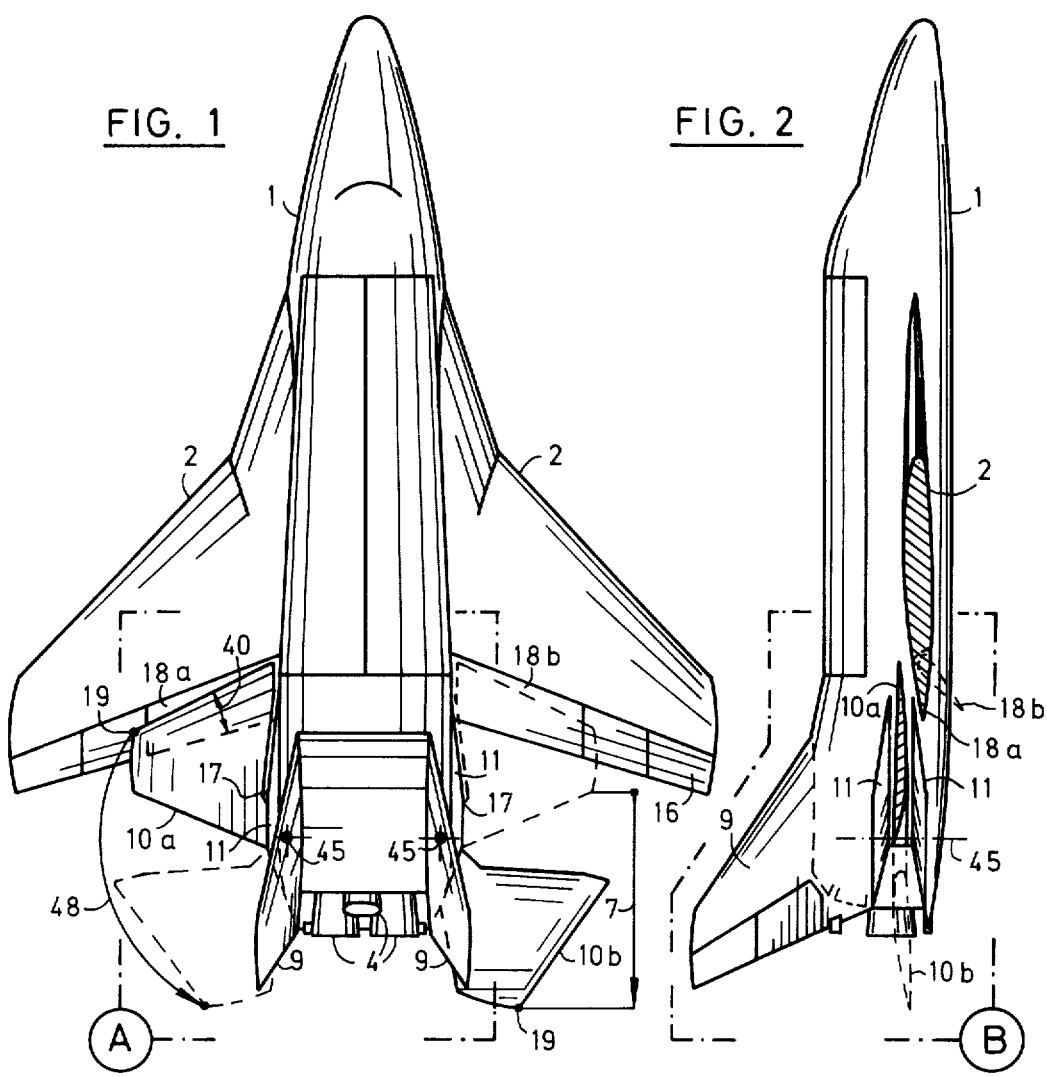
FIG. 1
FIG. 2
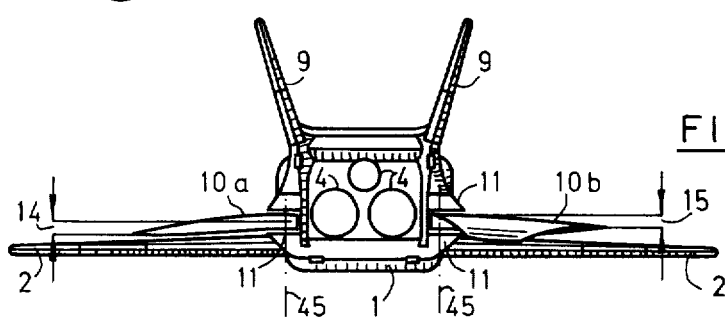
FIG. 3

(FRAGMENT "A")

(SECTION C-D)

(FRAGMENT "B")

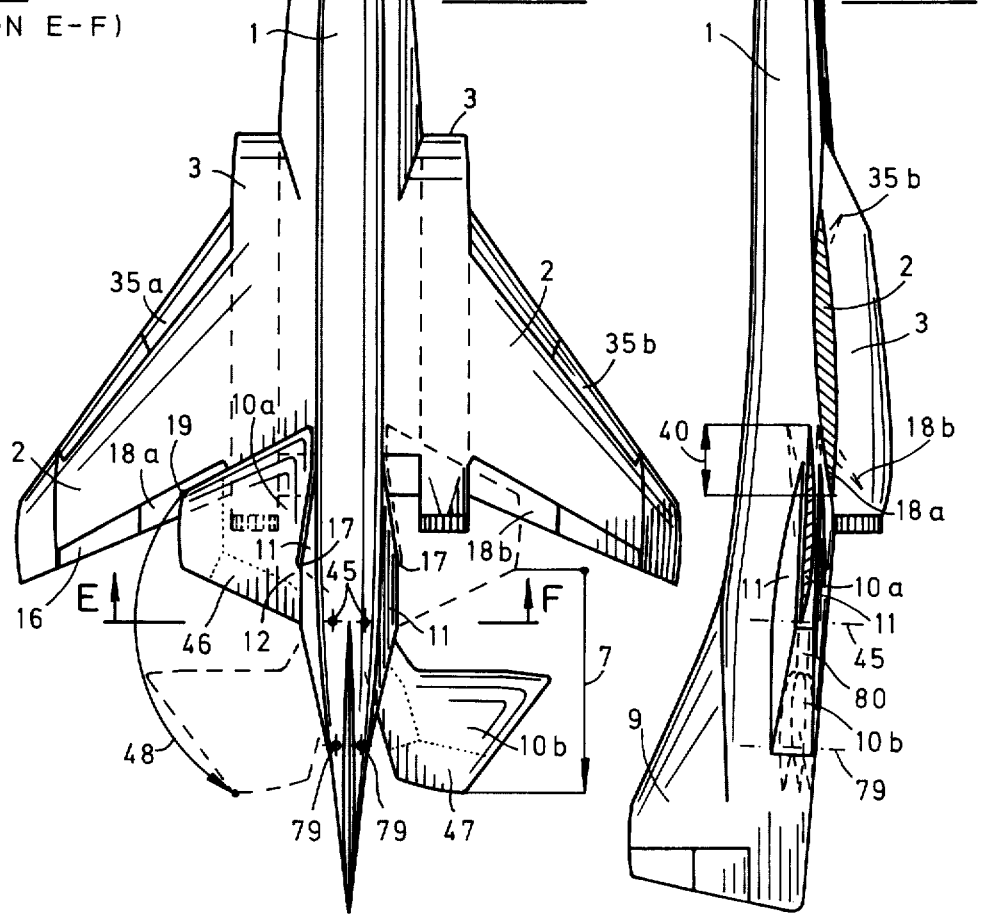

SWINGTAIL FOR SPACECRAFT AND FOR FAST AIRCRAFT

This application is a continuation-in-part of my co-pending application Ser. No. 508,319 filed Dec. 4, 1974, now abandoned.

BACKGROUND AND SUMMARY OF THE INVENTION

This invention relates generally to aerial and space vehicles, and relates with particularity to supersonic aircraft and to space shuttles having a reduced takeoff and landing speed, an improved safety during takeoff and landing operations, and a reduced supersonic impact wave resistance. One of the major problems associated with the design of modern fast aircraft is to create means guaranteeing repeated and safe takeoffs and alightings of said aircraft. This relates with particularity to spacecraft which are landing with enormous high speeds. Also the tailless aircraft configuration — favourable for other flight situations — has a disadvantageous influence on the landing operation because it does not allow usage of conventional landing flaps with large downward inclination angles for maximum lift and because the manoeuvrability of the landing aircraft is impaired.

A method of improving the landing operation of spacecraft and of fast aircraft, as contemplated by the present invention, involves a horizontal tail consisting of two tail halves, of which each half is swinging around a substantially vertical axis positioned inside of the fuselage from a forward high-speed flight position to a rearward low-speed flight position and vice versa. The forward swung horizontal tail halves are placed in planes lying above the planes of the wings and are so much moved forward that the leading edges of the horizontal tail halves are positioned in front of the trailing edges of the wings. This gives a heat-protection for the sharp leading edges of said horizontal tail halves by the wing planes during the entering operation of the spacecraft into the atmosphere, and a reduced supersonic impact wave resistance of the staggered wings and horizontal tail halves during the supersonic flight in the atmosphere on the basis of the area rule, with the corresponding saving of propulsion energy.

Accordingly, it is an object of the present invention to provide a new horizontal swingtail for fast flying aircraft to generally reduce the takeoff speeds and the landing speeds.

Another object of the present invention is the provision of a new horizontal swingtail for fast flying aircraft to improve the manoeuvrability during low flight speeds.

Another object of the present invention is the provision of a new horizontal swingtail for fast flying aircraft having originally the tailless configuration to enable usage of landing flaps with large downward inclination angles for maximum lift.

Another object of the present invention is the provision of a new horizontal swingtail for fast flying aircraft to improve the takeoff safety and the landing safety and to save human lifes during these critical flight operations.

Another object of the present invention is the provision of a new horizontal swingtail for fast flying aircraft to reduce the air resistance during supersonic flight speeds and thus save propulsion energy.

Another object of the present invention is the provision of a new horizontal swingtail for spacecraft.

Another object of the present invention is the provision of a new horizontal swingtail for supersonic aircraft.

Another object of the present invention is the provision of a new horizontal swingtail for fast flying aircraft enabling the reduction of the overlong takeoff and landing runways.

According to the present invention, the foregoing and other objects are attained by providing, in a spacecraft being capable for repeated space missions as a space shuttle or in a supersonic aircraft having a fuselage with one or more fixed vertical tails on its aft end, a pair of wings, rocket engines positioned in the aft end of said fuselage for the spacecraft or jet engines positioned on the bottom side of said pair of wings for the supersonic aircraft, a horizontal tail consisting of two halves and having a variable geometry with swinging movements of said tail halves in outside arcs rearwards and forwards again. The horizontal tail halves of the present invention are designed to be swung into a forward position for high-speed flight and located above the planes of the wings with leading edges positioned in front of the trailing edges of the wings For low-speed flight the tail halves are swung rearwards and compose in the aft position a commonly operating horizontal tail. Suitable means are provided to control the swinging movements and the angles of incidence of the horizontal tail halves.

Considering the weight of the swingtail, it will be compensated by the weight drop of the lighter undercarriage and chassis of the spacecraft or aircraft due to the reduced landing speed; whilst on the credit side remain:
an improved safety,
smaller runway dimensions, enabling landings of spacecraft on conventional runways, and
fuel savings in supersonic aircraft.

BRIEF DESCRIPTION OF THE DRAWINGS

A more complete appreciation of the invention and many of the attendant advantages thereof will be readily apparent by reference to the following detailed description when considered in connection with the accompanying drawings wherein:

FIG. 1; FIG. 2 and FIG. 3 show a spacecraft. FIG. 1 is the upper plan view, FIG. 2 the side elevational view, and FIG. 3 the rear view of the spacecraft. The left side of FIG. 1, the FIG. 2 and the left side of FIG. 3 represent the swingtail in its forward high-speed flight position, whereas the right side of FIG. 1 and the right side of FIG. 3 represent the swingtail in its rearward low-speed flight position. In FIG. 1 and FIG. 2 the dash lines show the respective different positions of the swinging horizontal tail halves.

FIG. 8 and FIG. 9 show a supersonic transport aircraft. FIG. 8 is the upper plan view, and FIG. 9 the side elevational view of the aircraft. The left side of FIG. 8 and FIG. 9 represent the swingtail in its forward high-speed flight position, whereas the right side of FIG. 8 represents the swingtail in its rearward low-speed flight position. In both figures the dash lines show the respective different positions of the swinging horizontal tail halves. The dotted lines on the horizontal tail halves illustrate the contours of the two types of elevators, if these elevators would be used.

FIG. 10 is a section taken along line E - F of FIG. 8 illustrating the elongations of the main spars of the horizontal tail halves changing over into the vertical beams, the movable connections between the vertical beams and the fuselage structure on their bottom and upper ends, and some parts of the control means for the elevators.

DETAILED DESCRIPTION AND OPERATION

Figure 4:
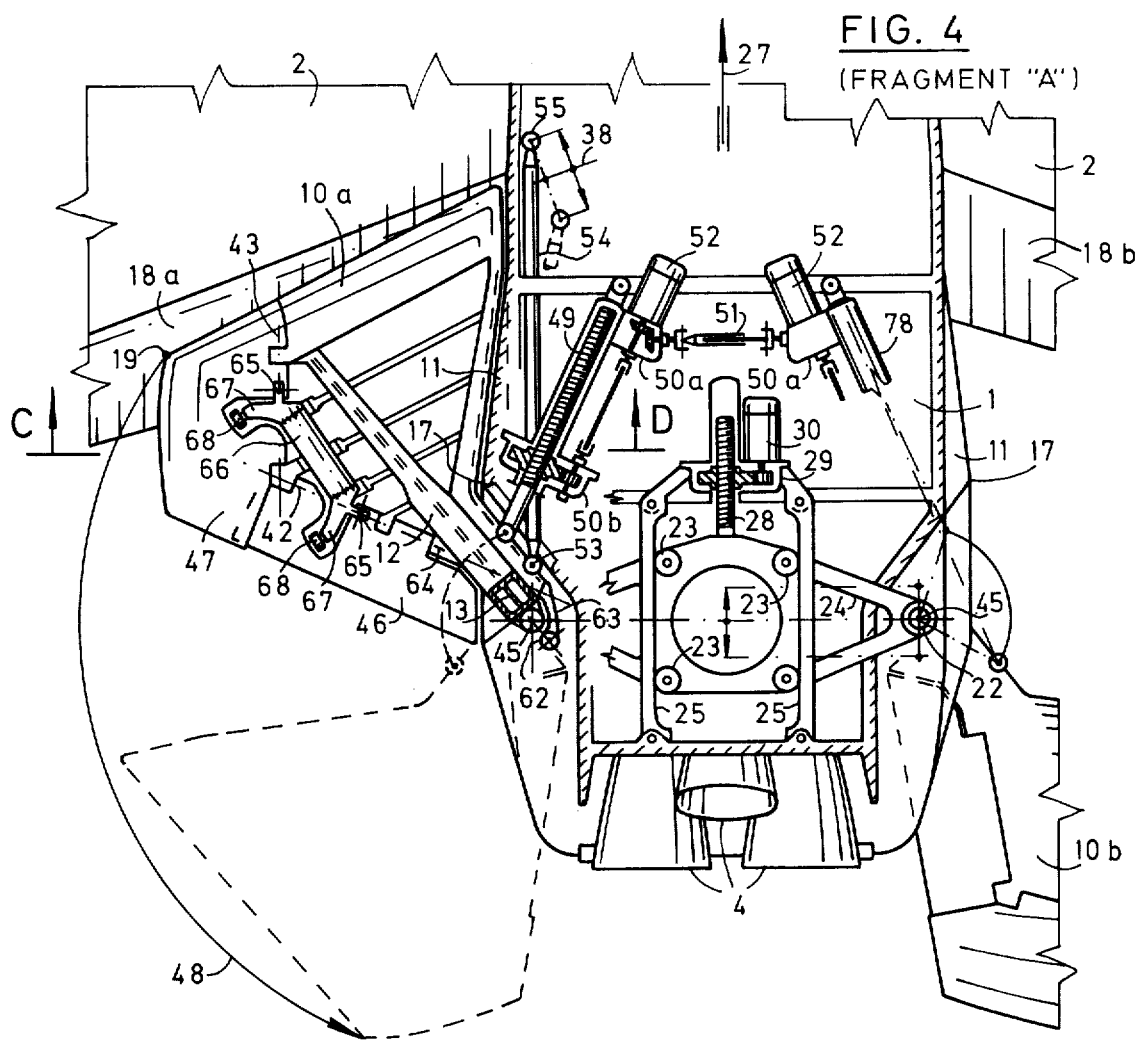
FIG. 4 show the fragment "A" of FIG. 1, but with removed upper skin panel, illustrating the control means for the swinging movements, the control means for the synchronically changings of the angles of incidence of both horizontal tail halves, the control means for the two elevators, and the coupling linkage between the swinging tail halves and the landing flaps.

Referring now more particularly to the drawings wherein like reference numerals designate identical parts in each of the views, and more particularly to FIG. 1; FIG. 2 and FIG. 3, there are:
 1. fuselage;
 2. wings;
 4. rocket engines;
 7. stroke of the horizontal tail movements;
 9. vertical tails;
 10a. horizontal tail half swung forward;
 10b. horizontal tail half swung rearward;
 11. adaptor fairing;
 14. lateral downward inclination of the horizontal tail halves during high-speed flight;
 15. lateral downward inclination of the horizontal tail halves during low-speed flight;
 16. ailerons;
 17. largest width of the rear fuselage;
 18a. landing flaps not engaged;
 18b. landing flaps engaged;
 19. lowest points of the tail planes;
 40. leading edge of the horizontal tail positioned in front of the trailing edge of the wing;
 45. swing axes of the horizontal tail halves;
 48. swing movement of each half of the horizontal tail.

The forwards swung horizontal tail halves 10a have their leading edges positioned in front of the trailing edges of the wings 40, which result in a heat protection for the sharp leading edges of the horizontal tail halves during the entering operation of the spacecraft into the atmosphere. For high-speed flight in the atmosphere have the forward swung horizontal tail halves air foil profiles being sharp at both the leading and the trailing edges, which give together with the staggered arrangement of the wings and the horizontal tail halves a reduced supersonic impact wave resistance.

For low-speed flight and for the landing operation the horizontal tail halves are swung rearward, having air foil profiles being round at the leading edges and sharp at the trailing edges. This gives an improved stability and manoeuvrability of the aircraft and spacecraft, and makes for instance the spacecraft better capable for repeated space missions.

Referring more particularly to FIG. 4, there are:
 12. protruding elongation of the main spar of the horizontal tail half;
 13. vertical beam;
 22. spherical joint;
 23. rollers;
 retaining frame, movable in longitudinal direction of the fuselage;
 25. rails;
 27. direction of flight;
 28. threaded spindle;
 29. gear;
 30. motor;
 38. rotational axis of the landing flaps;
 42. rotational axis of the high-speed flight elevator 46;
 43. rotational axis of the low-speed flight elevator 47;
 46. elevator for high-speed flight;
 47. elevator for low-speed flight;
 49. threaded spindle;
 50a. bevel gear;
 50b. spur gear;
 51. connecting shaft with universal joints and extension unit;
 52. motors;
 53. spherical joint;
 54. connecting rod to the landing flaps;
 55. spherical joint;
 62. spherical joint;
 63. control lever for elevators;
 64. control shaft for elevators;
 65. spherical joints;
 66. elliptical connecting shaft between the two elevators 46 and 47;
 67. levers on shaft 66;
 68. rollers attached to the levers 67, rolling in the interior of the elevators 46 and 47;
 78. casing tube.

The remaining reference numerals are as specified above.

The control means for the swinging operation of the horizontal tail halves consist of motors 52 and gear units 50a; 50b with threaded spindles 49, which swing the horizontal tail halves rearward and forward, and which hold them in each position. The control means for the left tail half and for the right tail half are connected with ech other by the shaft 51. Each tail half is coupled with the landing flap by the rod 54, whilst this coupling is kinematically so designed that the engagement movement of the landing flap(s) is progressively increasing in relation to the swing movement of the horizontal tail. For longitudinal control of the spacecraft the horizontal tail halves are synchronically changing their angles of incidence, which is achieved by common tilting movements of both swing axes 45 of the tail halves; and which is accomplishd by the motor 30, the gear 29, and the threaded spindle 28 which move the retaining frame 24 forwards and rearwards; whilst said retaining frame carries the spherical joints 22 which tail said swing axes 45.

An optical flight control of the spacecraft is accomplished by elevators positioned along the edges of the horizontal tail halves. There are elevators for high-speed flight 46 and elevators for low-speed flight 47 arranged on different edges of the horizontal tail halves.

The high-speed flight elevators 46 are controlled by the levers 63 and the shafts 64, and transfer their movements to the low-speed flight elevators 47 by means of elliptical shafts 66 having on their ends levers 67 with spherical joints 65 and rollers 68. This transferring linkages have a flat design, and can be accommodated within the tail profiles.

Figure 5:
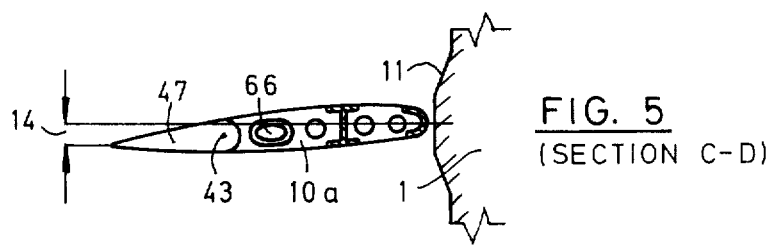
FIG. 5 is a section taken along line C - D of FIG. 4 illustrating the downwards inclined tail half with rounded edge positioned adjacent to the fuselage side wall.

Referring more particularly to FIG. 5, the reference numerals are as specified above The adaptor fairing 11 has a trapezoidal shape in the vertical section and the rounded edge of the horizontal tail half 10a follows the changing fairing thickness with a small gap.

Figure 6:
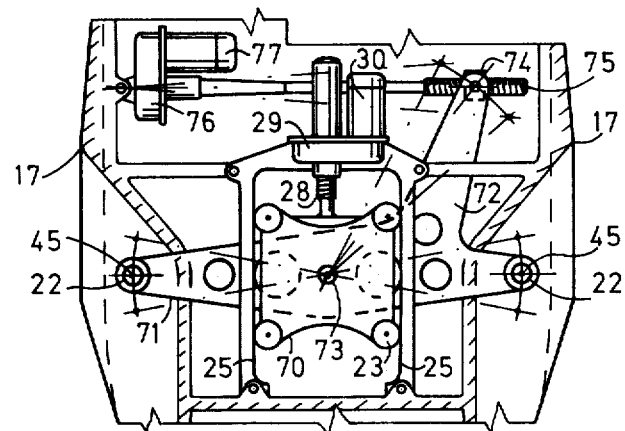
FIG. 6 shows an alternative to the middle part of FIG. 4 illustrating the control means for the counter-rotating changings of the angles of incidence of the two horizontal tail halves.

Referring more particularly to FIG. 6, there are:
70. chassis, movable in longitudinal direction of the fuselage;
71. cross-bar;
72. cantilever of the cross-bar 71;
73. turning joint between the chassis 70 and the cross-bar 71;
74. nut, swingingly attached;
75. threaded spindle;
76. gear;
77. motor.

The remaining reference numerals are as specified above.

For lateral control of the spacecraft the horizontal tail halves are oppositely changing their angles of incidence, which is achieved by different tilting movements of the two swing axes 45 of the tail halves; and which is accomplished by the motor 77, the gear 76, and the threaded spindle 75 which by means of the cantilever 72 turn the cross-bar 71 around the joint 73 so that one cross-bar end moves rearward and the other cross-bar end forward or vice versa. The cross-bar ends are carrying the spherical joints 22 which tilt said swing axes 45.

Figure 7:
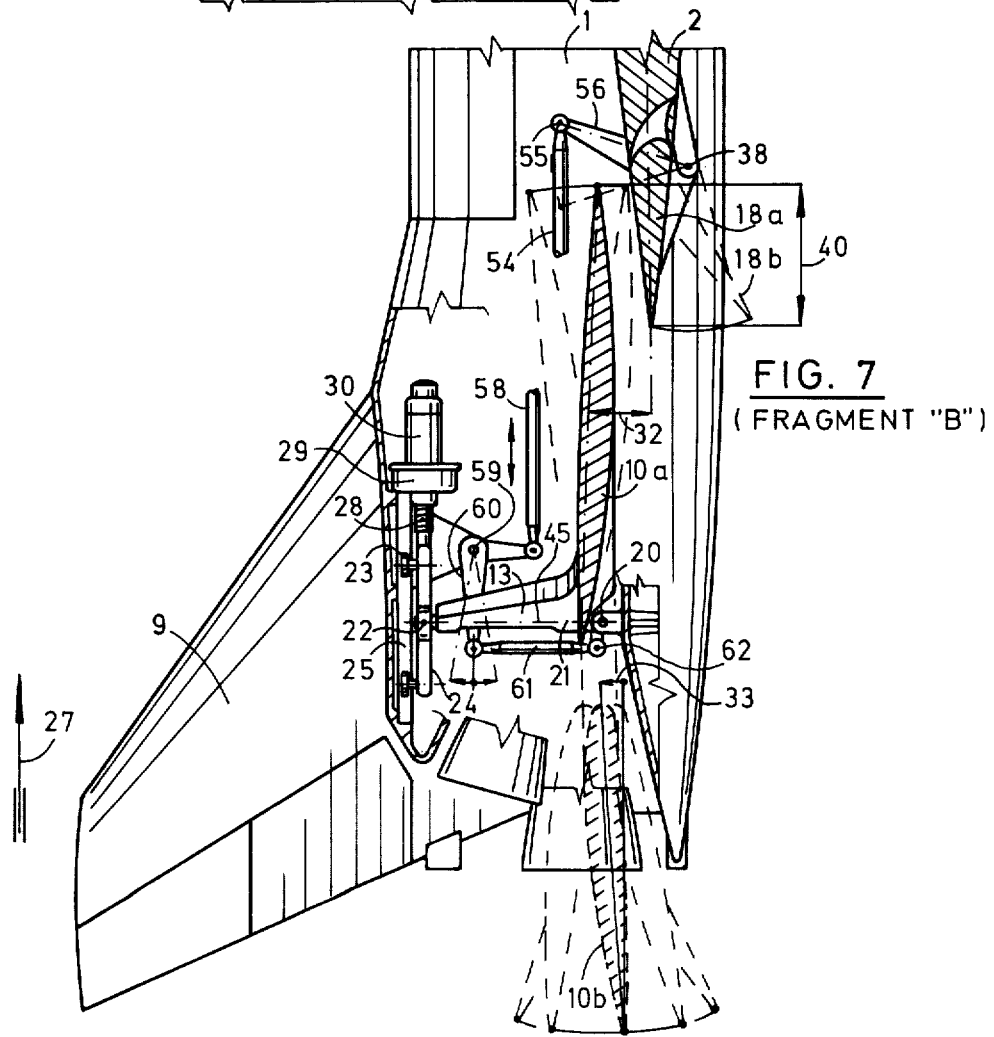
FIG. 7 show the fragment "B" of FIG. 2, but with removed side skin panel, illustrating the control means for the changings of angles of incidence of the horizontal tail halves the control means for the elevators, and the different angles of incidence of one horizontal tail half in its forward and rearward position.

Referring more particularly to FIG. 7, there are:
20. swivel joint;
21. swing bearing;
32. chord of the horizontal tail negatively inclined with respect to the chord of the wings during high-speed flight;
33. positive angle of incidence of the horizontal tail durng low-speed flight;
58. lever of landing flaps;
58. control of rod for the elevators;
59. shaft;
60. lever(s);
61. rods.

The remaining reference numerals are as specified above

The vertical beams 13 are movable connected with the spacecraft or aircraft. The bottom end connections with the fuselage structure are composed of swivel joints 20 with spherical intermediate rings for the tilting movements, and of a swing bearing 21 for the swinging movements, which both joints are holding the vertical and the lower horizontal air forces and the mass forces of the horizontal tail halves. The upper end connections with the retaining frame 24 or with the cross-bar 71 consist of said spherical joints 22, which transfer horizontal forces only.

Referring more particularly to FIG. 8 and FIG. 9, there are:
3. jet engines;
5. forward stabilizer plane;
6. sharp horizontal leading edge of the stabilizer plane 5;
35a. slat not engaged;
35b. slat engaged;
79. swing axes of the trapezoidal covers 80;
80. trapezoidal cover, swings inwards.

The remaining reference numerals are as specified above

The swingtail is of the same design as for the spacecraft, but the swing axes 45 are positioned near to each other.

The adaptor fairing 11 — on each fuselage side — has its front end placed behind the foremost corner of said forward swung horizontal tail half 10a, from where the fairing is rearward by gradually growing in thickness, while the rounded edge of said forward swung horizontal tail half 10a follows the fairing thickness with a small gap. The maximum fairing thickness is reached in the point17 that also represents the largest width of the rear fuselage, from which point the fairing has a constant thickness for some distance and from which point also starts a rearward slot in the fairing that is growing in vertical width towards the rear. The slot is used for accommodation of the high-speed flight elevator 46 during low-speed flight. For high-speed flight the slot is closed by means of a trapezoidal cover 80, that swings inward around the rearward axis 79 for low-speed flight to make room for the elevator 46. The cover 80 is not provided for the spacecraft.

The maximum fairing thickness ends at the back corner of the forward swung horizontal tail half 10a, from which point the fairing is gradually reduced in thickness untl it reaches the fuselage side wall. In vertical sections the fairing has trapezoidal shapes.

Referring more particularly to FIG. 10, the reference numerals are as specified above.

The protruding elongations 12 of the main spars of the horizontal tail halves are changing over into the vertical beams 13 by means of curved connection pieces. The vertical beams 13 are movable connected with the spacecraft or aircraft. The bottom end connections of the vertical beam 13 with the fuselage structure are composed of swivel joints 20 with spherical intermediate rings having for both joints a common swivel axis positioned horizontally and transversally to the longitudinal axis of the fuselage, and of swing bearings 21 being concentrically arranged with the swing axes 45. The upper end connections 22 of the vertical beams 13 with the retaining frame 24 or with the cross-bar 71 are spherical joints which are concentrically arranged with the swing axes 45.

The rods 61 are only used when the elevators 46 and 47 are adopted.

Two embodiments of the invention have been shown and described but it will be understood that these are by way of example only and that alternations and modifications may occur to those skilled in the art which are included within the scope of the following claims.

I claim:
1. In aircraft being capable for repeated space missions as space shuttles and for supersonic flights in the atmosphere (FIG. 8; FIG. 9 and FIG. 10), and having increased safety landing capabilities with improved manoeuvrability at low flight speeds the improvement comprising:
   a fuselage (1) with fixed vertical tail(s) (9) positioned on its aft end, a pair of wings (2) swept outwardly and rearwardly with respect to the sides of said fuselage equiped with ailerons (16) and landing flaps (18a; 18b), propulsion means mounted on said aircraft, a horizontal tail (10a; 10b) consisting of two halves and having a variable geometry with swinging movements (48) of said tail halves in outside arcs rearward and forward again, a. the said horizontal tail halves being swung to a forward position (10a) for high-speed flight and particularly for the entering operation into the atmosphere and for the supersonic flight in the atmosphere, b. the said horizontal tail halves being swung to a rearward position (10b) for low-speed flight and particularly for the landing or takeoff operation, c. each half of said horizontal tail having a trapezoidal shape, d. each half of said horizontal tail having at one corner of the base-line of said trapezoidal shape a protruding elongation of its main spar (12) which by means of a curved connection piece changes over into a substantially vertical beam (13) incorporating the substantially vertical swing axis (45) around which said half of said horizontal tail swings (48) in a substantially horizontal plane rearwards or forwards, e. each said vertical beam (13) being at its bottom end movable connected with the fuselage structure, f. each said vertical beam (13) being at its upper end movable connected (22) with a retaining frame (24) which is movable in longitudinal direction of said fuselage rearwards or forwards, g. each half of said horizontal tail having control means for said rearward and forward swing movements h. each half of said horizontal tail being coupled said said landing flap (18a; 18b) for common control movements, i. each half of said horizontal tail having in two cross-sections positioned substantially perpendicular to each other two different air foil profiles of which one profile is advantageous for supersonic flight speeds being at both edges sharp and the second profile is advantageous for subsonic flight speeds being at one edge round (which acts as the leading edge) and at the other edge sharp (which acts as the trailing edge), j. the said forward swung horizontal tail halves (10a) being placed in planes lying above the planes of said wings (FIG. 1 to FIG. 3; FIG. 4; FIG. 7 to FIG. 9) and being so much moved forward that the leading edges of said horizontal tail halves are positioned in front of the trailing edges of said wings (40) whereby the sharp leading edges of said horizontal tail halves are heat protected by the wing planes during the entering operation of said spacecraft into the atmosphere, and whereby the supersonic impact wave resistance of the swept wings and horizontal tail halves is reduced during the supersonic flight in the atmosphere, k. the said forward swung horizontal tail halves (10a) having negative profile cambers and negatively inclined chords (32) (FIG. 7) with respect to the chords of said wings (FIG. 2; FIG. 7 and FIG. 9), l. the said horizontal tail halves getting continuously increasing positive angles of incidence in relation to the local streamline direction during said rearward swing movements to produce additional lift during low-speed flight, which positive angles of incidence are continuously turned back during said forward swing movements of said horizontal tail halves, m. the said fuselage (1) carrying adaptor fairings (11) on both rear side walls adjacent to the two said horizontal tail halves.

2. The aircraft of claim 1 wherein said movable connection between the bottom end of each said vertical beam (13) and the fuselage structure (FIG. 7 and FIG. 10) is composed of a swivel joint (20) with a spherical intermediate ring having a horizontal swivel axis positioned transversally to the longitudinal axis of said aircraft and of a substantially vertical swing bearing (21) being concentrically arranged with said swing axis (45), which both joints are holding the vertical and the lower horizontal air forcees and the mass forces of said horizontal tail half.

3. The aircraft of claim 1 wherein said movable connection (22) between the upper end of each said vertical beam (13) and said retaining frame (24) (FIG. 7 and FIG. 10) is a spherical joint which is concentrically arranged with said swing axis (45) and which transfers horizontal forces only.

4. The aircraft of claim 1 wherein said rearward or forward movements of said retaining frame (24) (FIG. 4; and FIG. 7) tilt said both swing axes (45) and said both vertical beams (13) commonly rearward or forward which synchronously changes the angles of incidence of both said horizontal tail halves (10a; 10b) in relation to the local streamline directions and which is utilized for longitudinal control of said aircraft, whilst said rearward or forward movements of said retaining frame (24) are accomplished by the motor (30) and the gear (29) incorporating a spindle nut which engages the threaded spindle (28) that is put into translatory movements, and said spindle is connected with said retaining frame (24), said retaining frame (24) is carrying rollers (23) rolling along the rails (25), while said rails are fastened to the fuselage structure.

5. The aircraft of claim 1 wherein instead of said retaining frame (24) is used a cross-bar (71) attached to a chassis (70) by means of a turning joint (73) (FIG. 6) with a vertical turning axis, and said chassis (70) is carrying rollers (23) rolling along rails (25), while said rearward or forward motions of said chassis (70) with said cross-bar (71) are accomplished by a motor (30) and gear (29) incorporating a spindle nut which engages a threaded spindle (28) connected with said chassis (70); and said cross-bar (71) has a cantilever (72) with a swingingly attached nut (74) that engages a threaded spindle (75) which is driven by the motor (77) and the gear (76), wherein the energizing of said motor (77) turns said cross-bar (71) around said joint (73) so that one end of said cross-bar moves rearward and its other end forward or vice versa which tilts the two said swing axes (45) and the two said vertical beams (13) in different directions rearward and forward or vice versa with counter-rotating changings of the angles of incidence of the two said horizontal tail halves (10a; 10b) in relation to the local streamline directions and which is utilized for lateral control of said aircraft.

6. The aircraft of claim 1 wherein optional longitudinal and lateral flight controls are accomplished by elevators positioned along the edges of said horizontal tail halves (FIG. 4; FIG. 5; FIG. 7 and FIG. 8) of which — for each tail half — an elevator for high-speed flight (46) is positioned along the rear side edge of said trapezoidal tail half shape and an elevator for low-speed flight (47) is positioned along the small top edge of said trapezoidal tail half shape, and both said elevators are used alternately depending upon the flight speeds and upon said swing movement positions (10a or 10b) of said horizontal tail half, wherein the control of said elevators — for each said horizontal tail half — is accomplished by a control shaft (64) (FIG. 4) of said high-speed flight elevator (46), by a control lever (63) attached to the end of said shaft, and by a spherical joint (62) on the end of said lever, which joint (62) is positioned in close proximity to said swing axis (45), and which joint is the attachment point for a substantially vertically arranged rod (61) (FIG. 7 and FIG. 10) with a second spherical joint on its upper end connecting said rod with the lever means (60), said lever means can synchronously or differentially control said elevators of said aircraft, whilst in the interior of each said horizontal tail half is accommodated a control connection between the said elevator for high-speed flight (46) and the said elevator for low-speed flight (47) (FIG. 4) consisting of an ellipitical shaft (66) having on both ends levers (67) with spherical joints (65) and rollers (68) of which said spherical joints (65) are positioned in the points of intersection between the axis of said elliptical shaft and the two control axes of said elevators whereas said rollers (68) are attached to the protruding arms of said two levers (67) and are rolling on arched paths in the interior of said two elevators (46 and 47), and wherein said changings of the angles of incidence of said horizontal tail halves by said rearward or forward tilting of said swing axes (45) and said vertical beams (13); are utilized for trimming purposes only.

7. The aircraft of claim 1 wherein said control means for said rearward and forward swing movements of each half of said horizontal tail (FIG. 4) consist of a motor (52), an intermediate shaft, a bevel gear (50a), a spur gear (50b) incorporating a spindle nut and engaging the threaded spindle (49) which by means of an universal joint is connected with said protruding elongation of the main spar (12) of said horizontal tail half whereas said threaded spindle has a casing tube (78) which on its outside end is connected with the fuselage structure by means of a second universal joint, and said control means of both said horizontal tail halves are connected with each other by means of a connecting shaft (51) incorporating two universal joints on the shaft ends and an extension unit so that swing movements of both said horizontal tail halves are synchronized.

8. The aircraft of claim 1 wherein said coupling between each half of said horizontal tail and said landing flap (18a; 18b) (FIG. 4 and FIG. 7) is accomplished by a rod (54) connected with said protruding elongation of the main spar (12) of said horizontal tail half by means of a spherical joint (53) whereas a second spherical joint (55) connects said rod (54) with the lever (56) of said landing flap, and said connecting linkage is kinematically so designed that the engagement movement of said landing flap is proressively increasing in relation to the swing movement of said horizontal tail half, which is accomplished by arrangement of the center of rotation of said swing axis (45), of said spherical joint (53), and of said rod (54) in a substantially straight line when said horizontal tail half is in its forward high-speed flight position (10a) (FIG. 4).

9. The aircraft of claim 1 wherein said two different air foil profiles of said horizontal tail halves are so arranged that when said horizontal tail halves are swung into said forward high-speed flight positions (10a) their longitudinal sections have sharp leading edges and sharp trailing edges (FIG. 2; FIG. 7 and FIG. 9), in which positions the lateral sections of said horizontal tail halves have round edges arranged adjacent to the fuselage side walls and sharp edges provided on their outsides (FIG. 5), and that said round edges will be turned into the air stream during said rearward swing movement (48) whereby in said low-speed flight positions (10b) said horizontal tail halves have longitudinal sections with round leading edges and sharp trailing edges (FIG. 2; FIG. 7 and FIG. 9).

10. The aircraft of claim 1 wherein said continuous increase of positive angles of incidence of said horizontal tail halves during said rearward swing movements and said continuous turning back of these angles of incidence during said forward swing movements are accomplished by downward inclination angles of said horizontal tail halves (10a; 10b) with respect to said swing axes (45) (FIG 10), which is comprised in the downward inclination angles (14 and 15) (FIG. 3 and FIG. 5), and which is realized by a design having the points (19) arranged as the lowest points of the tail half planes, whilst said points (19) are the forward outer corners of said forward swung horizontal tail halves or the rearward outer corners of said rearward swung horizontal tail halves (FIG. 1; FIG. 3; FIG. 4 and FIG. 8).

11. The aircraft of claim 1 wherein each said adaptor fairing (11) has a first front end placed behind the foremost corner of said forward swung horizontal tail half (10a), from where said fairing (shown in the plan view in FIG. 1; FIG. 4; FIG. 6 and FIG. 8) is rearwards gradually growing in thickness — while said rounded edge of said forward swung horizontal tail half (10a) follows the fairing thickness with a small gap — until the maximum fairing thickness is reached in the point (17) that also represents the largest width of the rear fuselage, from which point said fairing has a constant thickness for some distance and from which point also starts a rearward slot in the fairing that is growing in vertical width towards the rear, that is used for accommodation of said high-speed flight elevator (46) during low-speed flight, and that is closed by means of a trapezoidal cover (80) for the supersonic flight of said aircraft (FIG. 9), whilst said cover (80) swings inward around the rearward axis (79) for low-speed flight to make room for said elevator (46), and the maximum fairing thickness ends substantially at the back corner of said forward swung horizontal tail half (10a), from which point said fairing is gradually reduced in thickness until it reaches the fuselage side wall, whereas in vertical sections said fairing has trapezoidal shapes (FIG. 3; FIG. 5 and FIG. 10).

* * * * *